US005460498A

United States Patent [19]

Steel et al.

[11] Patent Number: 5,460,498

[45] Date of Patent: Oct. 24, 1995

[54] CENTRIFUGAL SPINNING

[75] Inventors: Margaret L. Steel, Cheshire, England; Philip Norton-Berry, Clwyd, Wales

[73] Assignee: Imperial Chemicals Industries PLC, London, England

[21] Appl. No.: 268,653

[22] Filed: Jun. 29, 1994

Related U.S. Application Data

[63] Continuation of Ser. No. 739,146, Aug. 1, 1991, abandoned.

[30] Foreign Application Priority Data

Aug. 3, 1990 [GB] United Kingdom .................. 9017157

[51] Int. Cl.$^{6}$ .............................. B29B 9/00; B29C 39/00

[52] U.S. Cl. .................................. 425/8; 65/516; 264/8; 425/72.2

[58] Field of Search ................................ 425/7, 8, 72.2, 425/464; 264/8, 164; 239/703, 223, 224; 65/6, 8, 14, 15, 516; 204/157.41

[56] References Cited

U.S. PATENT DOCUMENTS

| | | | |
|---|---|---|---|
| 4,178,336 | 12/1979 | Snowden | 264/8 |
| 4,197,063 | 4/1980 | Davidson | 264/8 |
| 4,288,397 | 9/1981 | Snowden et al. | 264/164 |
| 4,294,783 | 10/1981 | Snowden | 425/8 |
| 4,311,570 | 1/1982 | Cowen et al. | 204/157.41 |
| 4,458,844 | 7/1984 | Mitsui | 234/703 |
| 4,603,070 | 7/1986 | Steel et al. | 264/8 |
| 4,745,095 | 1/1989 | Shepard | 234/224 |
| 4,784,332 | 11/1989 | Takeuchi et al. | 239/703 |
| 4,919,333 | 4/1990 | Weinstein | 239/223 |

FOREIGN PATENT DOCUMENTS

| | | | |
|---|---|---|---|
| 2804633 | 8/1978 | Germany . | |
| 296626 | 5/1965 | Netherlands | 425/8 |
| 2026904 | 2/1980 | United Kingdom . | |
| 1581192 | 12/1980 | United Kingdom . | |

*Primary Examiner*—Jay H. Woo
*Assistant Examiner*—Joseph Leyson
*Attorney, Agent, or Firm*—Cushman Darby & Cushman

[57] ABSTRACT

Centrifugal spinning apparatus includes an annular, usually cup-shaped, spinning member which has a smooth interior surface extending towards the spinning end thereof which has spinning points formed thereon and grooves which extend across the end from the interior surface to the points to direct material in liquid form thereto.

12 Claims, 3 Drawing Sheets

CENTRIFUGAL SPINNING

This is a continuation of application Ser. No. 07/739,146, filed on Aug. 1, 1991, which was abandoned upon the filing hereof.

The invention relates to centrifugal spinning.

BACKGROUND OF THE INVENTION

The use of centrifugal spinning apparatus for the production of a variety of product forms such as fibers, particles and powders and as a reactor for chemical reactions is known. Examples of such uses and apparatus therefore can be found in GB-A-1439777, GB-A-1515511, GB-A-2004204, GB-A-2004206, GB-A-2026904, GB-A-2118866, EP-B-0017510, EP-B-0056001, EP-A-0168817, EP-A-0177207, U.S. Pat. No. 4,178,336, U.S. Pat. No. 4,197,063, U.S. Pat. No. 4,440,700 and U.S. Pat. No. 4,678,490. The spinning conditions can be controlled to determine whether liquid medium being spun forms fibres or filaments or breaks up into droplets to form particles and powders.

Typically, the apparatus has a disc or annular member to which liquid medium, ie solution or melt, is fed to be spun therefrom. Discs tend to spin the liquid medium in sheet form which is not conducive to forming good fibres or relatively uniform powders. In apparatus utilising an annular member, the member may have a plurality of passages through which the liquid medium is spun. In use, the passages of such members may become blocked. Additionally, the liquid medium my creep circumferentially around the member away from the exit of the passage leading to intermittent break away of the medium from the surface of the member and deterioration of quality of the product. In alternative forms of annular member, the liquid medium may be spun from an end of the member. However, circumferential creep of the medium may be a problem in that instance also, as may be uniformity of flow of the liquid medium to the edge of the member from which it is spun. Other problems associated with the spinning of fibers include "shot" formation, ie small particles, fiber melding and fiber bonding, wide uncontrolled variations in particle/fibre sizes and malformations such as lumps of material.

It is an object of the present invention to provide a centrifugal spinning apparatus in which one or more of the aforementioned disadvantages is reduced or obviated.

SUMMARY OF THE INVENTION

According to the present invention, a centrifugal spinning apparatus comprises an annular spinning member mounted for rotation on an axis concentric therewith, drive means for rotating the member and material feed means having an exit in the member, the member having an interior surface which is relatively smooth over a region extending axially from an end of the member from which material in liquid form is spun towards the exit of the material feed means, said end of the member having a plurality of spinning points formed on the external periphery thereof and grooves which extend across said end from the interior surface to the external periphery thereof to direct material in liquid form to the spinning points.

In a preferred form of the apparatus, the member is cup shaped and is mounted for rotation on the axis at its closed end. Alternatively, the member may in the form of an annular sleeve open at both ends and being mounted for rotation on the axis by means such as a spider or flange located generally centrally of the sleeve. In that instance, material can be spun from both ends of the sleeve, particularly when the product form is particles or powders.

DETAILED DESCRIPTION OF THE INVENTION

In use of the apparatus, although various orientations of the apparatus can be envisaged, the preferred orientation is with the axis disposed substantially vertically and, when the member is cup shaped and to be used for fiber spinning, with the open end of the member facing downwardly.

Preferably, the smooth region of the interior surface is substantially cylindrical. Alternatively, the smooth region of the interior surface may be divergent at least in part, eg immediately adjacent the exit of the material feed means, the surface diverging towards said end of the member from which material is spun. In some embodiments more than one divergent section may be provided. In other embodiments the interior of the member immediately adjacent the exit of the material feed means may be formed to promote mixing, eg steps may be provided to impart radial shear forces to material moving along the interior surface of the member in an axial direction towards the smooth region of the interior surface. The smooth region of the interior surface of the member enables a substantially uniform film of material in liquid form to be established thereby contributing to the optimization of the probability of obtaining a relatively uniform product form.

Preferably, the spinning points are defined by V-shaped formations coincident with the outer ends of the grooves. In one form of the apparatus according to the invention, the grooves and their respective V-shaped formations are symmetrical, the planes of symmetry of the grooves either being coincident with diametral planes or with planes which intersect diametral planes at acute angles thereto and along lines parallel to the axis whereby the spinning points are trailing the diametral planes relative to the direction of rotation of the member. In the latter instance, the angle is typically in the range 5° to 15°, and is usually of the order of 10°.

In another form of apparatus according to the invention, the grooves and their respective V-shaped formations are asymmetrical, the base of each groove lying substantially in a diametral plane of the member or, alternatively, in a plane intersecting a diametral plane at an acute angle thereto and along a line parallel to the axis whereby the spinning points are trailing the diametral planes relative to the direction of rotation of the member. In the latter instance, the angle is typically in the range 5° to 15°, and is usually of the order of 10°. In this form of apparatus, the trailing face of each groove, relative to the direction of rotation of the member, either lies in the plane in which the base of the groove lies or, more preferably, lies in a plane which intersects the plane in which the base of the groove lies along the base of the groove and at an angle, in the direction of rotation of the member, of up to say 30°, typically 10° or 15°. The leading face of the groove, relative to the direction of rotation of the member is at an angle of between 20° and 60°, typically 30° to the trailing face of the groove.

Preferably, the spinning points are at a radius from the axis which is greater than the radius of the external surface of the member immediately adjacent the spinning points. In a preferred arrangement, the external surface of the member is smoothly flared out to meet the extremity of the spinning points. In that instance, the minimum included angle of the generally frusto-conical plane in which the flared region of the external surface lies is about 12° but is preferably of the order of 30°. It has been found that this type of construction tends to minimize creep of the material being spun over the edge of the member and axially along its external surface before it breaks away from the member.

Preferably, said end of the member from which material is spun is bevelled whereby said end diverges outwardly from the interior surface of the member towards the external periphery of said end. Typically, the included angle of the generally frusto-conical surface bounding said end is in the range 60° to 120° and is preferably about 90°.

Preferably, guide members such as fins are provided at the interior surface of the spinning member at locations intercalated between the mouths of the grooves, the guide members being of such a length that, in use, the film of material in liquid form established in the smooth region of the interior surface of the spinning member is split or divided into separate flow streams by the guide members before it reaches the grooves. This arrangement minimizes viscoelastic effects which may result in non-uniform flow of the material in liquid form in the grooves thereby contributing to the optimization of the probability of obtaining a relatively uniform product form. The guide members may be formed integrally with the member or, alternatively, they may be provided on an insert member which is located within the spinning member. In the latter instance, the guide members and the insert are dimensioned such that the guide members are a close fit with the interior surface of the spinning member.

The guide members lie in diametral planes or, alternatively, when the grooves are asymmetrical, in planes including the trailing faces of the grooves.

As will be appreciated by those skilled in the art, under any given set of operating conditions, when the amount of material fed to each of the spinning points is the same, the size of the product obtained from the apparatus will tend to be a distribution of sizes. The apparatus according to the invention can be readily adapted to give multimodal, eg bimodal, distribution of sizes of the product. Such multimodal distribution of product size is achieved by arranging the guide members such that the amount of material fed to one or more of the grooves is different to the amount of material fed to each of the remainder of the grooves.

In a preferred embodiment of the invention, a centrifugal spinning apparatus comprises an annular spinning member mounted for rotation on an axis concentric therewith, drive means for rotating the member and material feed means having an exit in the member, the member being cup-shaped and having an interior surface which is relatively smooth over a region extending from adjacent the exit of the material feed means towards an end of the member from which material in liquid form is spun, said end of the member having a plurality of spinning points formed on the external periphery thereof, the spinning points being at a radius from the axis which is greater than the radius of the external surface of the member, and grooves which extend across said end from the interior surface to the external periphery thereof to direct material in liquid form to the spinning points.

In another preferred embodiment of the invention, a centrifugal spinning apparatus comprises an annular spinning member mounted for rotation on an axis concentric therewith, drive means for rotating the member and material feed means having an exit in the member, the member being cup-shaped and having an interior surface which is relatively smooth over a region extending from adjacent the exit of the material feed means towards an end of the member from which material in liquid form is spun, said end of the member having a plurality of spinning points formed on the external periphery thereof, the spinning points being at a radius from the axis which is greater than the radius of the external surface of the member, grooves which extend across said end from the interior surface to the external periphery thereof to direct material in liquid form to the spinning points and guide members mounted on the interior surface of the spinning member at locations intercalated between the mouths of the grooves.

In yet another preferred embodiment of the invention, a centrifugal spinning apparatus comprises an annular spinning member mounted for rotation on an axis concentric therewith, drive means for rotating the member and material feed means having an exit in the member, the member being cup-shaped and having an interior surface which is relatively smooth over a region extending from adjacent the exit of the material feed means towards an end of the member from which material in liquid form is spun, said end of the member having a plurality of spinning points formed on the external periphery thereof, the spinning points being at a radius from the axis which is greater than the radius of the external surface of the member, grooves which extend across said end from the interior surface to the external periphery thereof to direct material in liquid form to the spinning points, the grooves being asymmetrical and having their trailing faces, relative to the direction of rotation of the member, lying substantially in diametral planes or in planes intersecting diametral planes at acute angles thereto and along lines parallel to the axis, and guide members mounted on the interior surface of the spinning member at locations intercalated between the mouths of the grooves.

The drive means can be any suitable drive means capable of driving the spinning member at suitable rotational speeds usually, in dependence upon the diameter of the spinning member, in excess of 1000 rpm and typically at rotational speeds of between 3000 rpm and 25000 rpm. Typically, the drive means comprises an electric motor and associated control equipment.

The feed means may be a suitable feed supply tube which may incorporate distribution means forming or adjacent the exit thereof in the spinning member. When the spinning member is cup-shaped, it is preferred that the feed means enters the member from the closed end thereof. Typically, the feed means may be mounted concentrically with the axis and may also form a support for mounting the spinning member for rotation on the axis. Alternatively, the feed means may be mounted parallel to the axis.

The spinning member in apparatus according to the invention tends to function as a gas pump and, accordingly, it can cause considerable difficulties in controlling gas flows in the apparatus. Consequently, as a matter of practicality, it is preferred to minimize those problems by providing the member with a complementary insert member which substantially fills the member at least in the region thereof adjacent the spinning end of the member and which preferably has a planar end lying substantially in the plane containing the spinning end of the member. The annular gap between the spinning member and the insert is relatively small and, to avoid boundary layer pumping effects, is generally not more than about 5 mm.

The surfaces of such an insert member facing the exit of the feed means can be used to confine material fed into the spinning member in an axial sense and to define part of a distribution flow path from the exit to the interior surface of the spinning member.

The apparatus according to the invention is suitable for spinning material in liquid form, ie from solution or melt, optionally including a dispersed phase or particulate materials, in a variety of product forms such as relatively continuous fibers, discontinuous fibers and particles and powders. When the solution is to be heated or the material is to be spun from a melt, the apparatus includes heater means such as induction heating coils. When the material is to be spun from a melt, the material can be supplied to the spinning member as a melt and maintained in a molten state by the heating means; or, alternatively, it can be supplied to the spinning member as powder or pellets or other convenient form and be heated by the heating means in the spinning member to form a melt at the interior surface of the member.

The apparatus according to the invention can incorporate suitable plenum arrangements for supplying one or more streams of air or other Eases, either at ambient or cooled or heated, for assisting in the formation of the product form required.

The product form produced by the apparatus according to the invention can be collected in any suitable manner such as, for fibrous products, by conveyor or rotary drum and, for particles and powders, by cyclone collectors.

It will be appreciated that, in some forms of the apparatus according to the invention, more than one spinning member may be utilized in a stacked or nested relationship.

The invention includes a spinning member as hereinbefore defined in the centrifugal spinning apparatus according to the invention.

BRIEF DESCRIPTION OF THE DRAWINGS

Centrifugal spinning apparatus will now be described to illustrate the invention by way of example only and with reference to the accompanying drawings, in which.

Figure 1:
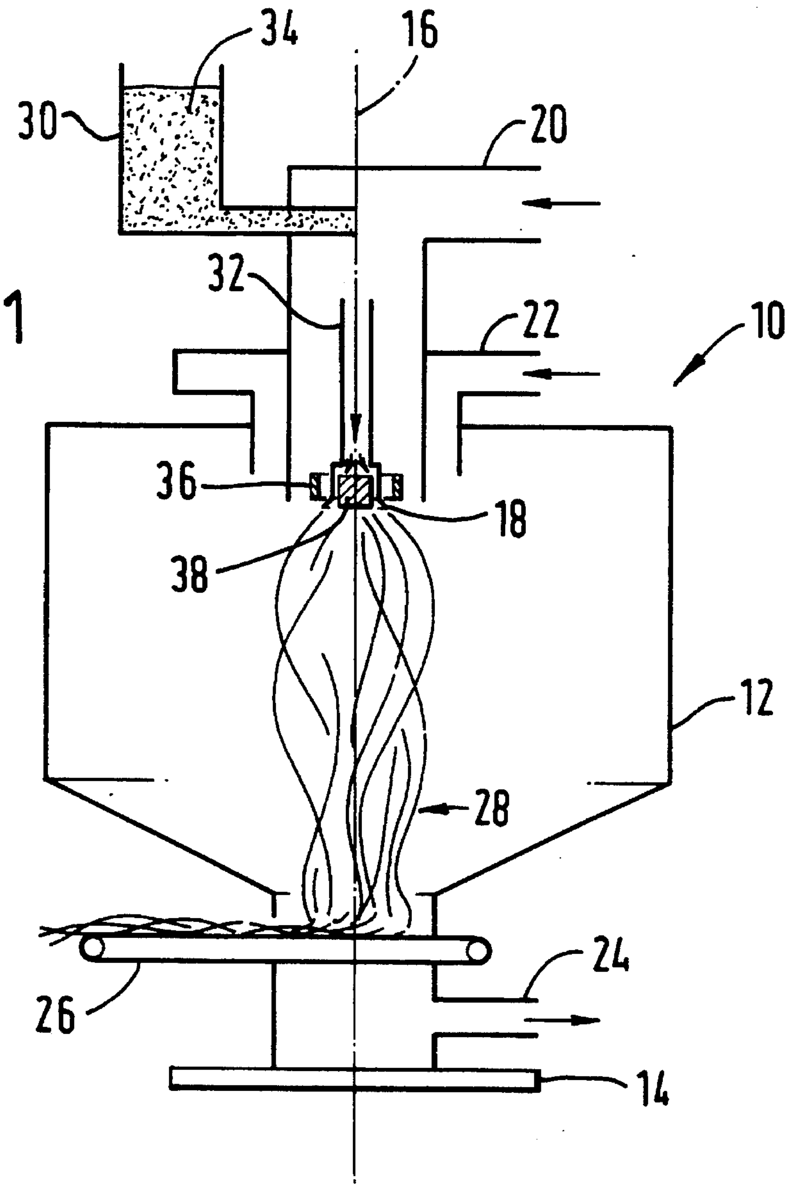
FIG. 1 is a schematic vertical cross-section through a typical centrifugal spinning apparatus incorporating a spinning member in accordance with the invention.

The centrifugal spinning apparatus 10 (see FIG. 1) has a housing 12 mounted on a base 14 and in which is mounted, for rotation on a vertical axis 16 by a drive mechanism (not shown), a cup-shaped spinning member 18. The upper end of the housing 12 has plenum arrangements 20, 22 through which primary and secondary air or other gases is fed, respectively, the air or other gases being at ambient temperature or, alternatively, being cooled or heated as required for a particular application by coolers and heaters (not shown), respectively. The lower end of the housing 12 has an exhaust duct 24 and a conveyor 26 for removing fibrous product 28 from the housing 12.

A feed hopper 30, which includes a suitable feed mechanism such as a screw conveyor (not shown), is located to feed material to the member 18 via a feed supply tube 32 mounted concentrically with the axis 16 in the plenum 20, the tube 32 having an exit in the spinning member 18 adjacent the closed end of the member 18. As indicated, the hopper 30 contains particulate or granular polymeric material 34, for example. The spinning member 18 has heater means such as an induction coil 36 connected to a suitable power supply and control means (not shown) and is provided with an insert member 38 to minimize turbulent gas flow within the apparatus 10 and within the member 18.

Figure 2:
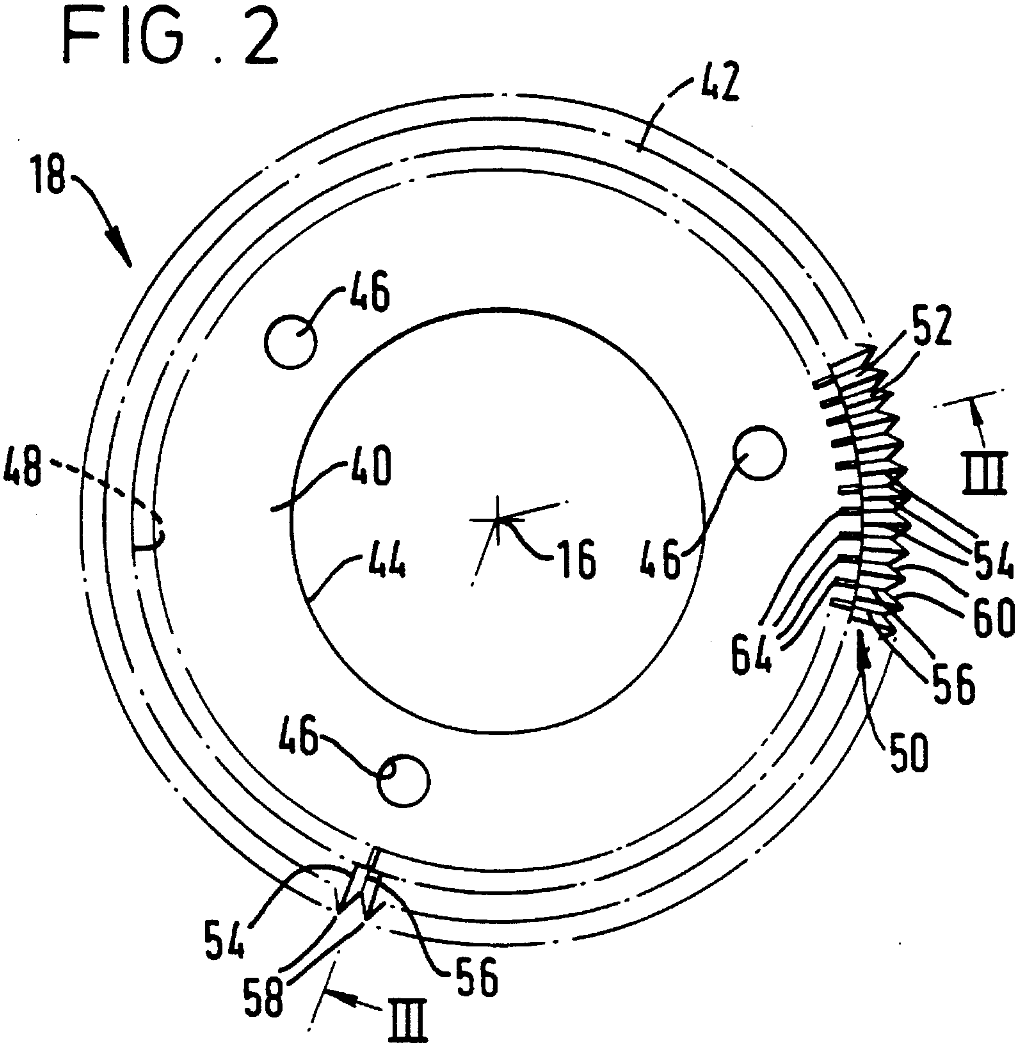
FIG. 2 is a bottom elevation of a spinning member according to one embodiment of the invention, showing for reasons of clarity only some of the spinning points and associated features.
Figure 3:
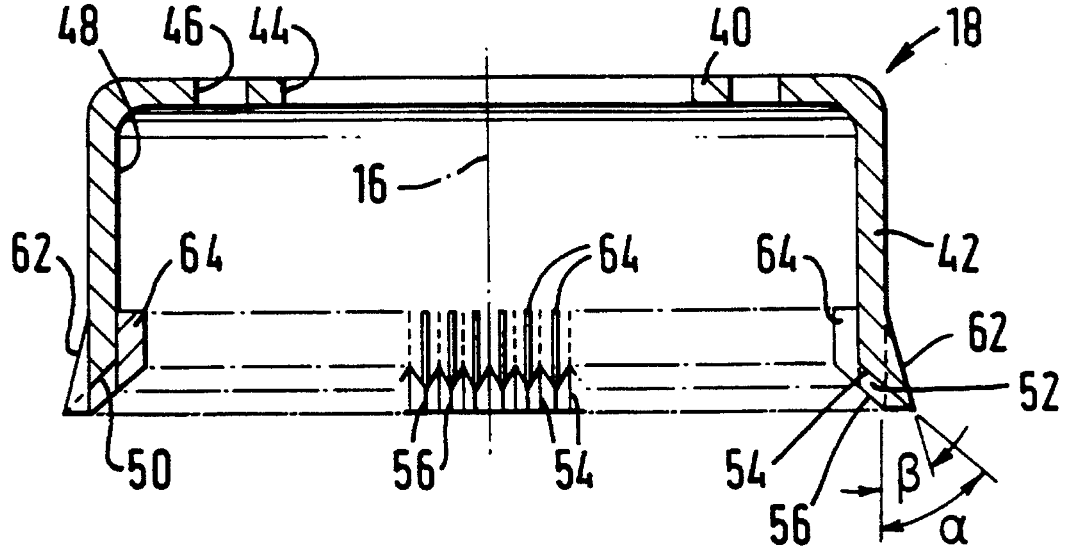
FIG. 3 is a section on line III—III in FIG. 2.

In a first embodiment (see FIGS. 2 and 3), the spinning member 18 is a cup-shaped member having a planar base 40 and a cylindrical wall 42 depending from the base 40.

The base 40 of the member 18 has a central aperture 44 through which a feed supply pipe extends and fixing apertures 46 by which the member 18 is mounted on the drive means for rotation on the axis 16.

The interior surface 48 of the wall 42 of the member 18 is smooth over a region extending from the base 40 to the bottom edge 50 of the member 18.

The edge 50 of the member 18 is bevelled and the generally frusto-conical surface bounding the edge 50 has an included angle of $2\alpha$ (see FIG. 3) wherein $\alpha=45°$. Grooves 52 extend across the edge 50 from the interior surface 48 of the member 18 to the external periphery of the member 18. The center lines or bases 54 and the peaks 56 of the grooves 52 lie in diametral planes.

The grooves 52 terminate in spinning points 58 defined by V-shaped formations 60 on the external periphery of the member 18. The formations 60 lie in a common plane parallel to the base 40 of the member 18. The portions of the external surface of the member 18 adjacent the formations 60 are flared smoothly outwardly toward the formations 60, the generally frusto-conical plane in which the flared region 62 lies has an included angle of $2\beta$ (see FIG. 3) wherein $\beta=15°$. Typically, a spinning member 18 of depth 70 mm and diameter 100 mm will have 120 or 180 spinning points.

Guide fins 64, which lie in diametral planes, are intercalated between the grooves 52 and are located on the lower region of the interior surface 48 of the member 18.

In use of the apparatus 10, the member is spun at a desired rate and either a solution of material, or particles or granules of material, to be spun is fed to the member 18 to an annular feed passage defined between the base 40 of the member 18 and an adjacent surface of the insert member 38. The material is forced to the periphery of base 40 by centrifugal force and down the interior surface 48 of the member 18. The solution, or the material as it becomes molten, under the influence of centrifugal force forms a substantially uniform film on the interior surface 48 of the member 18. When the film of solution, or melt, reaches the fins 64, it is split into substantially equal streams which are then guided to the mouths of the grooves 52. The solution, or melt, then flows along the grooves 52 to the spinning points 58 from which it is discharged as discrete filaments. Subject to the spinning conditions, the filaments either remain as filaments, whether continuous or discontinuous, the solvent being removed by evaporation, or the melt being cooled, or breaking up into discrete droplets to give a particulate or powder product form.

Figure 4:
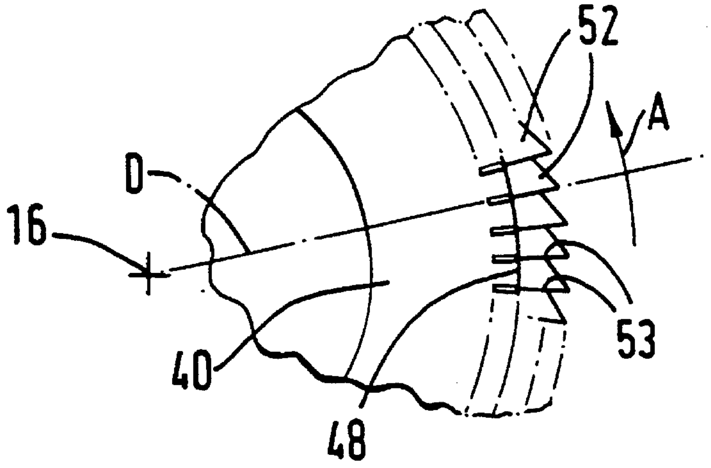
FIG. 4 is view similar to FIG. 2 but only of a segment of the spinning member according to a second embodiment of the invention.

In the embodiment shown in FIG. 4, the grooves 52 are asymmetrical, the bases of the grooves 52 and the trailing faces 53, relative to bowl rotation (indicated by arrow "3A"), of the grooves 52 lie in diametral planes "D". The leading faces of the grooves 52 are at an angle of 30° to the trailing faces 53. Because the trailing faces 53 of the grooves 52 lie in diametral planes "D", the solution or melt has a greater tendency to flow along the grooves 52 to the spinning points 58 rather than to flow over the peaks of the grooves to an adjacent groove.

Figure 5:
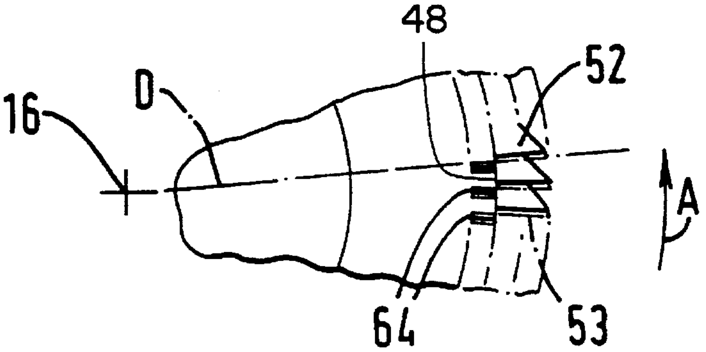
FIG. 5 is a view similar to FIG. 4 showing a modification of the second embodiment.

In a modification shown in FIG. 5, the trailing faces 53 of the grooves 52 lie in planes which intersect the diametral planes "D" along the bases of the grooves 52. Those planes are at angles of 10°, in the direction of rotation of the arrow "A", to the planes "D".

A further modification is shown in FIG. 5. The fins 64 lie in the same planes as the trailing faces 53 of the grooves 52. The inclining of the fins 64 in that manner results in a smoother transfer of material from the surface 48 into the grooves 52.

Figure 6:
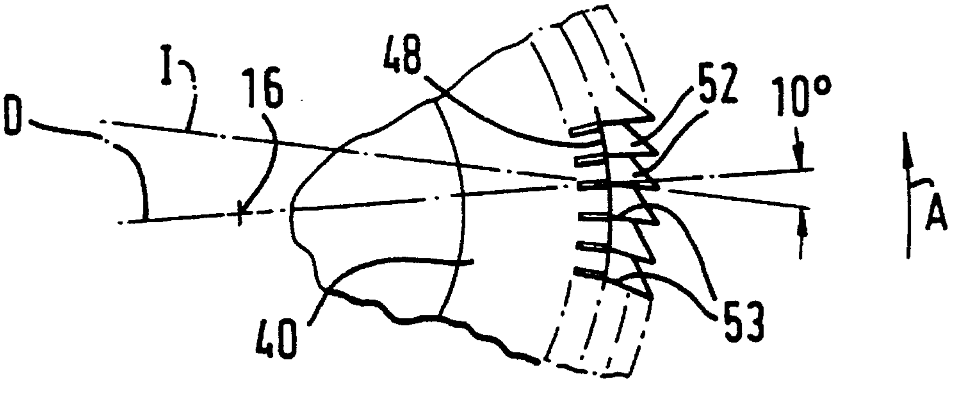
FIG. 6 is a view similar to FIG. 4 showing further modifications of the second embodiment.

In the embodiment shown in FIG. 6, the grooves 52 are the same as the grooves 52 shown in FIG. 4 except that trailing faces 53 of the grooves 52 lie in planes "I" which intersect diametral planes "D" at angles of 10° and along lines parallel to the axis 16. Owing to the circumferential component added to the radial component experienced by the filaments being discharged from the spinning points 58, the filaments exhibit greater stability and less tendency to shear away from the spinning points. Additionally, the filaments have a greater tendency to discharge from the actual points of the V-shaped formations 60 rather than from the trailing edge of the formations 60.

Figure 7:
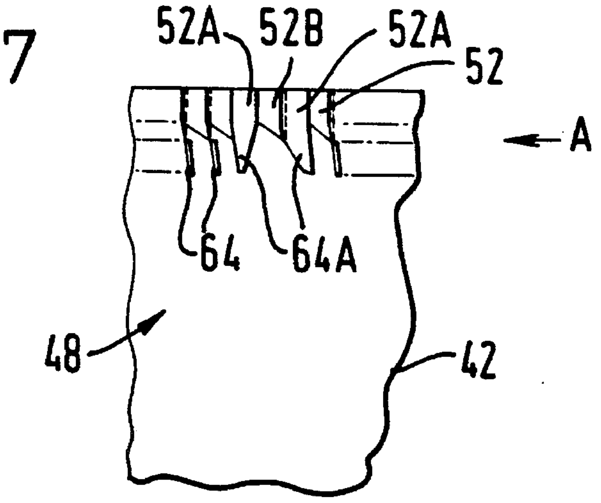
FIG. 7 is an internal radial view of part of the spinning member shown in FIG. 5 showing a modification which allows spinning of material in a multimodal size distribution.

In the modification shown in FIG. 7, two of the grooves 52A, one on each side of a groove 52B, are filled in. Associated with each of the grooves 52A is an enlarged guide fin 64A. In use, the fins 64A feed an amount of material to the groove 52B which would normally be distributed between the three grooves. The greater quantity of material flowing from the groove 52B results in a product form having a size distribution shifted away from the size distribution resulting from spinning the material from the grooves 52 thus giving bimodal distribution of product size.

It will be appreciated that more than one set of grooves 52A and 52B can be provided around the periphery of the spinning member 18 and that the number of grooves involved may differ, eg 2 or 4 etc. Furthermore, it will be apparent that such techniques can be readily adopted to give other distributions, eg trimodal.

It will be appreciated that the various modifications shown in the drawings can be used in various combinations.

As will be appreciated, the apparatus 10 shown in FIG. 1 is illustrative only and is not intended to be limitive. It will be apparent that the apparatus can take any convenient form depending upon the application, eg fiber spinning, spray drying etc, for which it is intended.

We claim:

1. Centrifugal spinning apparatus comprising an annular spinning member mounted for rotation on an axis concentric therewith, drive means for rotating said member and material feed means having an exit in said member, said member having an interior surface which is relatively smooth over a region extending axially from an end of said member from which material in liquid form is spun towards said exit of said material feed means, said end of said member having a plurality of spinning points formed on the external periphery thereof and grooves which extend across said end from said interior surface to said external periphery thereof to direct material in liquid form to said spinning points and in which said Spinning points are defined by V-shaped formations coincident with outer ends of said grooves.

2. Apparatus according to claim 1, in which said member is cup shaped and is mounted for rotation on said axis at its closed end.

3. Apparatus according to claim 1, in which said smooth region of said interior surface is substantially cylindrical.

4. Apparatus according to claim 1, in which said grooves and their respective V-shaped formations are symmetrical, the planes of symmetry of said grooves being coincident with diametral planes.

5. Apparatus according to claim 1, in which said grooves and their respective V-shaped formations are symmetrical, the planes of symmetry of said grooves being coincident with planes which intersect diametral planes at acute angles thereto and along lines parallel to said axis whereby the spinning points are trailing the diametral planes relative to the direction of rotation of the member.

6. Apparatus according to claim 1, in which said grooves and their respective V-shaped formations are asymmetrical, the base of each groove lying substantially in a diametral plane of said member.

7. Apparatus according to claim 1, in which said grooves and their respective V-shaped formations are asymmetrical, the base of each groove lying substantially in a plane intersecting a diametral plane at an acute angle thereto and along a line parallel to said axis whereby the spinning points are trailing the diametral planes relative to the direction of rotation of the member.

8. Apparatus according to claim 6 or claim 7, in which each groove defines a leading face and a trailing face, relative to the direction of rotation of said member, said leading face lying in the plane in which said base of said groove lies, and said trailing face lying in the plane in which said base of said groove lies.

9. Apparatus according to claim 1, in which said spinning points are at a radius from said axis which is greater than the radius of the external surface of said member immediately adjacent said spinning points.

10. Apparatus according to claim 1, in which said end of said member from which material is spun is bevelled whereby the external surface of said end diverges outwardly from said interior surface of the end towards said external periphery of said end.

11. Apparatus according to claim 1, in which guide members are mounted on said interior surface of said spinning member at locations intercalated between said grooves, said guide members being of such a length that, in use, a film of material in liquid form established in said smooth region of said interior surface of said spinning member is split or divided into separate flow streams by said guide members before it reaches said grooves.

12. Centrifugal spinning apparatus comprising an annular spinning member in the form of an annular sleeve open at both ends having an interior surface and mounted for rotation on an axis concentric therewith by means located centrally of said sleeve, drive means for rotating said member and material feed means having an exit in said member for directing material to said interior surface and wherein said interior surface is relatively smooth over a region extending axially from an end of said member from which material in liquid form is spun towards said exit of said material feed means, said end of said member having a plurality of spinning points formed on the external periphery thereof and grooves which extend across said end from said interior surface to said external periphery thereof to direct material in liquid form to said spinning points and in which said spinning points are defined by V-shaped formations coincident with outer ends of the grooves.

* * * * *